United States Patent
Ganiger et al.

(10) Patent No.: US 11,732,750 B2
(45) Date of Patent: Aug. 22, 2023

(54) BEARING SYSTEM WITH INDEPENDENT ADAPTIVE STIFNESS SUPPORT

(71) Applicant: General Electric Company, Schenectady, NY (US)

(72) Inventors: Ravindra Shankar Ganiger, Bangalore (IN); Thomas D. Woodrow, Wyoming, OH (US); Weize Kang, Mason, OH (US); Praveen Sharma, Bangalore (IN); Ambika Shivamurthy, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/192,116

(22) Filed: Mar. 4, 2021

(65) Prior Publication Data

US 2022/0282755 A1 Sep. 8, 2022

(51) Int. Cl.
  *F16C 19/00*  (2006.01)
  *F02C 7/06*  (2006.01)
  *F01D 25/16*  (2006.01)
  *F03D 80/70*  (2016.01)
  *F03D 13/20*  (2016.01)

(52) U.S. Cl.
  CPC .............. *F16C 19/00* (2013.01); *F01D 25/16* (2013.01); *F02C 7/06* (2013.01); *F03D 13/20* (2016.05); *F03D 80/70* (2016.05); *F05B 2240/221* (2013.01); *F05B 2240/50* (2013.01);
  (Continued)

(58) Field of Classification Search
  CPC .......... F01D 25/16; F01D 25/162; F02C 7/06; F05D 2240/50; F16C 19/04; F16C 19/507; F16C 19/06; F16C 19/08; F16C 21/00; F16C 2360/23; F16C 32/0629; F16C 32/0633; F16C 32/064; F16C 32/0651; F16C 33/1045; F16C 33/106;
  (Continued)

(56) References Cited

U.S. PATENT DOCUMENTS 6,886,986 B1  4/2005  Gigi
7,658,547 B2  2/2010  Glueck
(Continued)

OTHER PUBLICATIONS

Dellacorte, Novel Super-Elastic Materials for Advanced Bearing Applications, Advances in Science and Technology, vol. 89, 2014, pp. 1-9. https://ntrs.nasa.gov/archive/nasa/casi.ntrs.nasa.gov/20140010477.pdf.
(Continued)

*Primary Examiner* — Christopher R Legendre
(74) *Attorney, Agent, or Firm* — Dority & Manning, P.A.

(57) ABSTRACT

A bearing system is configured to surround a rotor along a circumferential direction corresponding to the rotor. The rotor is extended along an axial direction co-directional to a centerline axis of the rotor. The bearing system includes a body from which a plurality of first support members is each extended, and wherein the plurality of first support members is spaced apart from one another along the circumferential direction. Each first support member includes a first axial support arm extended along the axial direction and a first radial support arm extended from the first axial support arm along a radial direction. The first radial support arm is configured to position a bearing element in contact with a bearing surface at the rotor.

16 Claims, 11 Drawing Sheets

(52) U.S. Cl.
CPC ...... *F05D 2240/50* (2013.01); *F05D 2260/70* (2013.01); *F16C 2360/31* (2013.01)

(58) Field of Classification Search
CPC .... F16C 33/1065; F16C 33/581; F16C 33/66; F16C 33/6659; F16C 33/6662; F16C 37/007
See application file for complete search history.

(56) References Cited

U.S. PATENT DOCUMENTS

| | | | |
|---|---|---|---|
| 7,857,519 B2 * | 12/2010 | Kostka | F16C 27/04 384/535 |
| 8,043,045 B2 | 10/2011 | Clark et al. | |
| 8,342,796 B2 * | 1/2013 | Spencer | F16C 27/045 415/113 |
| 8,591,121 B2 | 11/2013 | Suzuki et al. | |
| 8,628,251 B2 | 1/2014 | Kondou | |
| 8,662,756 B2 | 3/2014 | Care et al. | |
| 9,982,707 B2 * | 5/2018 | Nicholas | F16C 19/26 |
| 10,001,028 B2 * | 6/2018 | Ganiger | F01D 25/16 |
| 10,060,290 B2 * | 8/2018 | Moniz | F01D 25/18 |
| 2008/0187263 A1 | 8/2008 | Spielfeld et al. | |
| 2013/0004111 A1 | 1/2013 | Sadamura et al. | |
| 2018/0163780 A1 | 6/2018 | de Graffenried | |
| 2019/0178104 A1 | 6/2019 | Joshi et al. | |
| 2019/0353051 A1 * | 11/2019 | Ganiger | F01D 25/164 |

OTHER PUBLICATIONS

Torres, Stress Corrosion Evaluation of Nitinol 60 for the International Space Station Water Recycling System, NASA/TM-2016-218230, Nov. 2016, 38 Pages. http://www.summitmaterials.com/sm-100/bearing-components/.

NASA, High-Strength Superelastic Compounds, Materials and Coatings, NASA Technology Transfer Program, TOP3-412, 2 Pages. https://technology.nasa.gove/patent/TOP3-412.

* cited by examiner

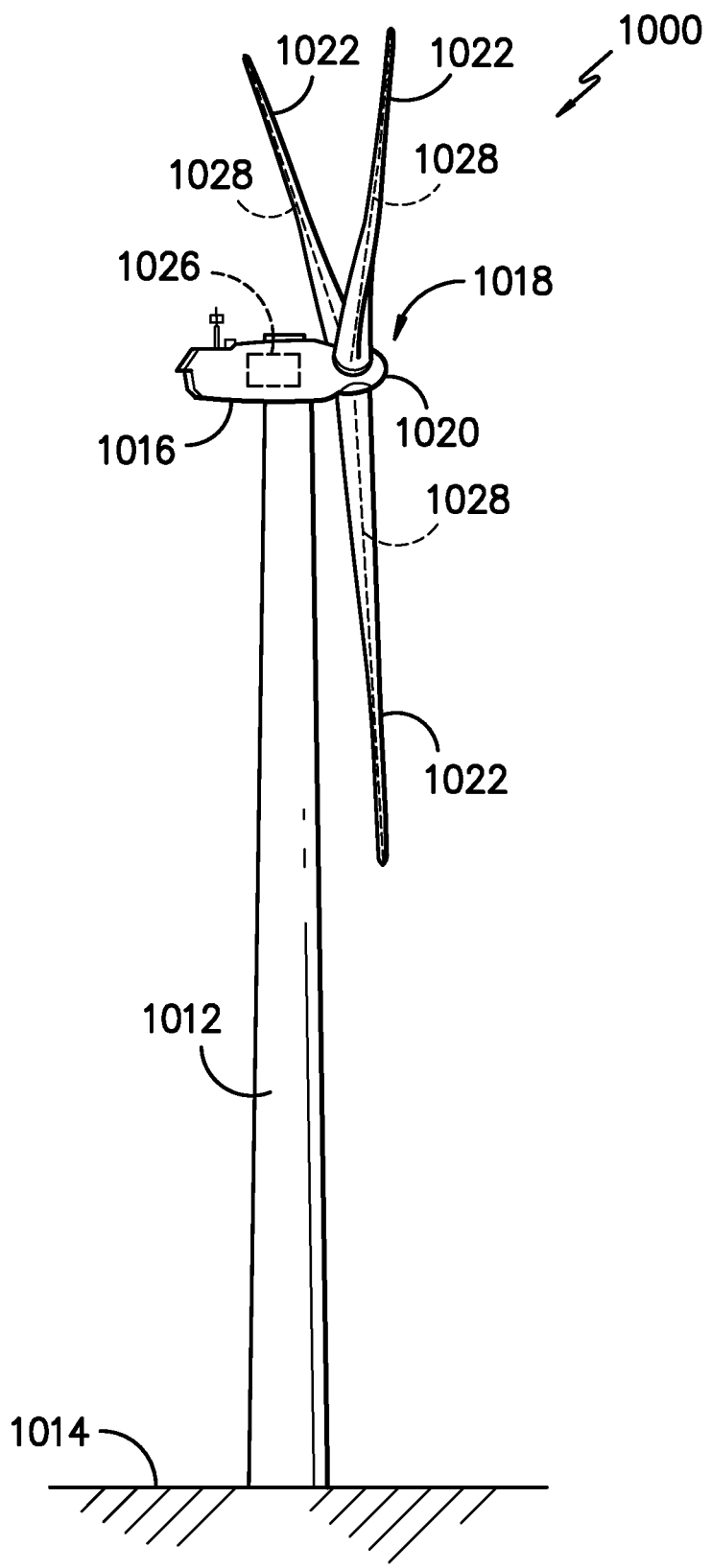
FIG. -1-

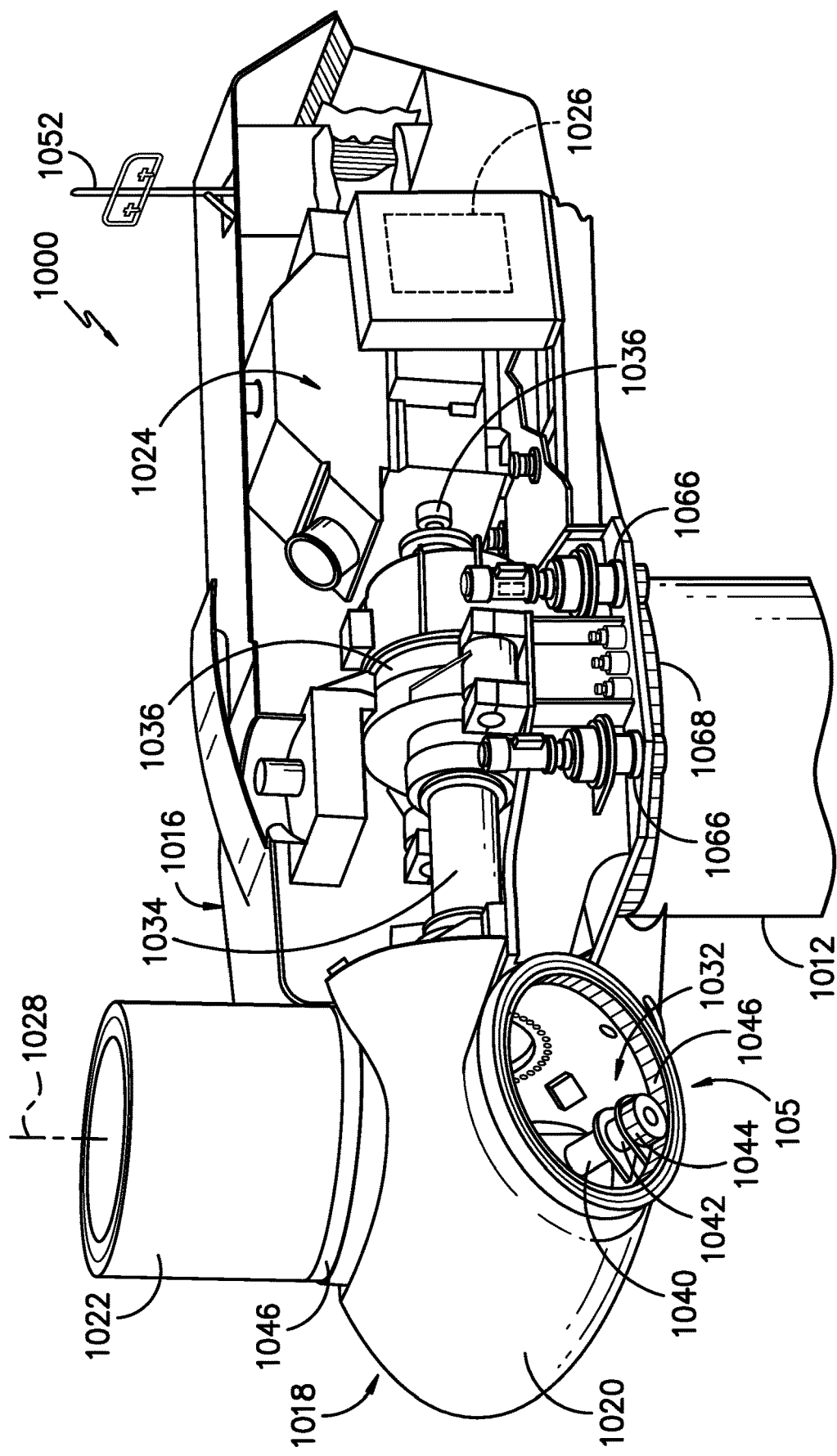

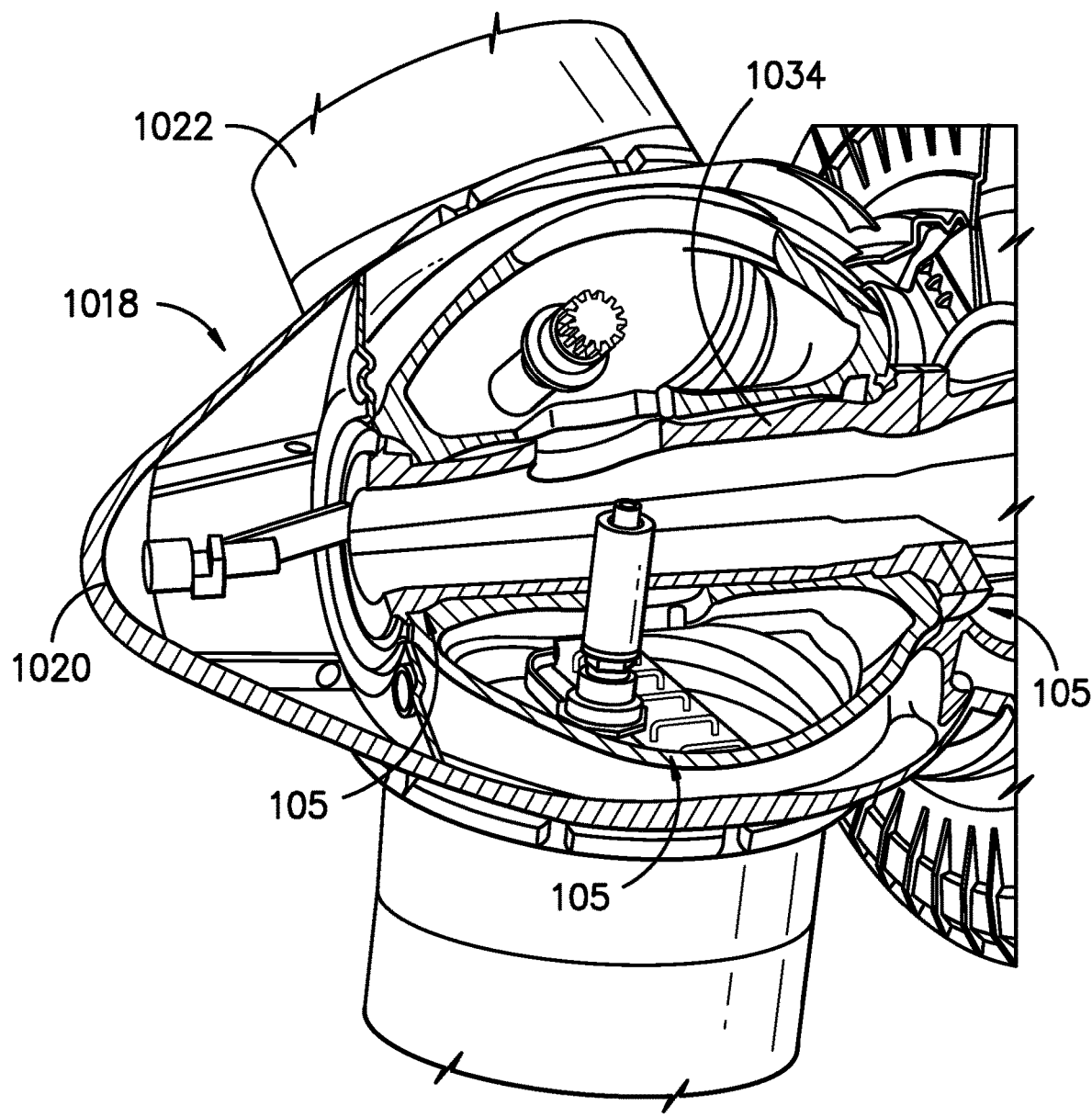
FIG. -3-

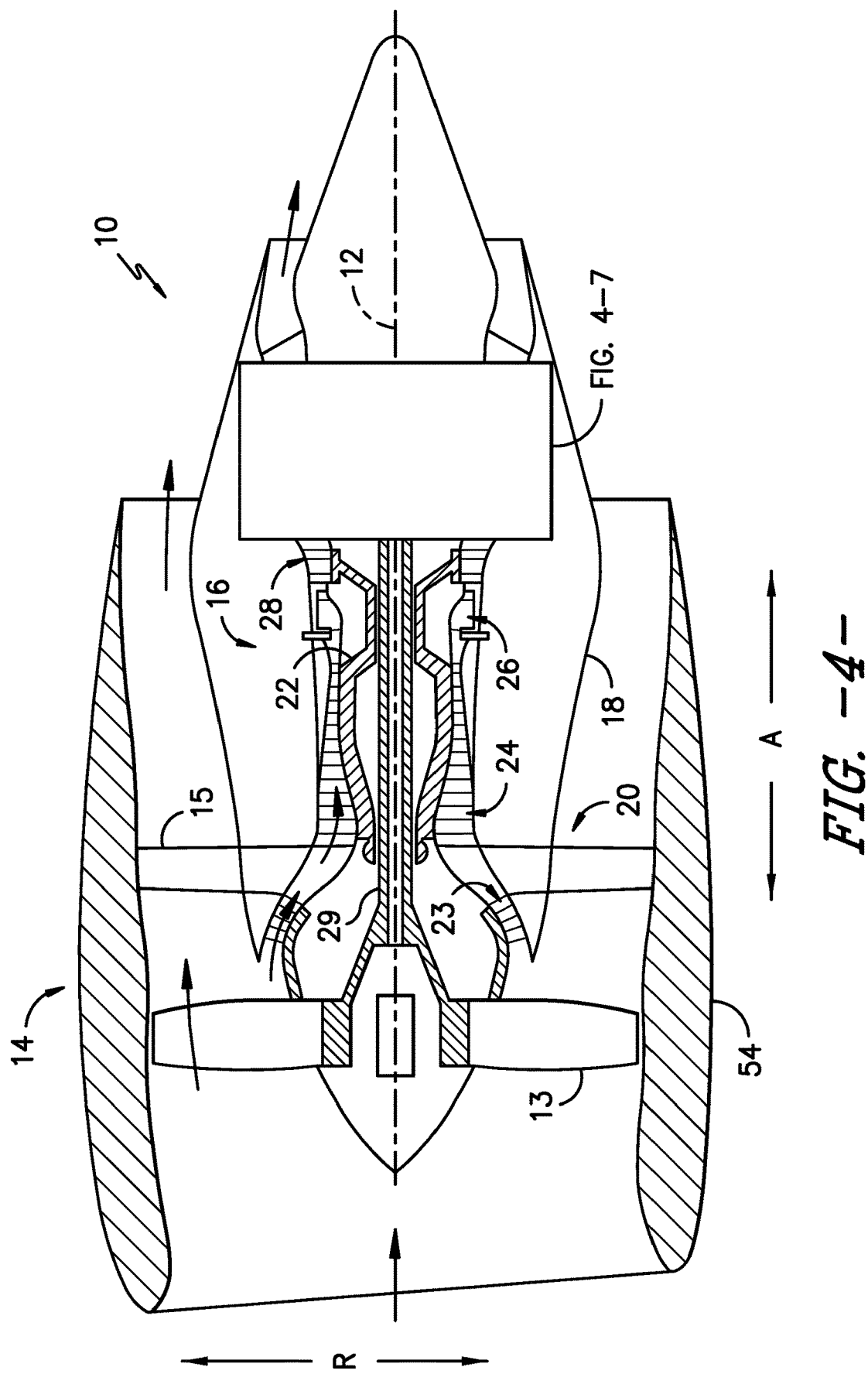

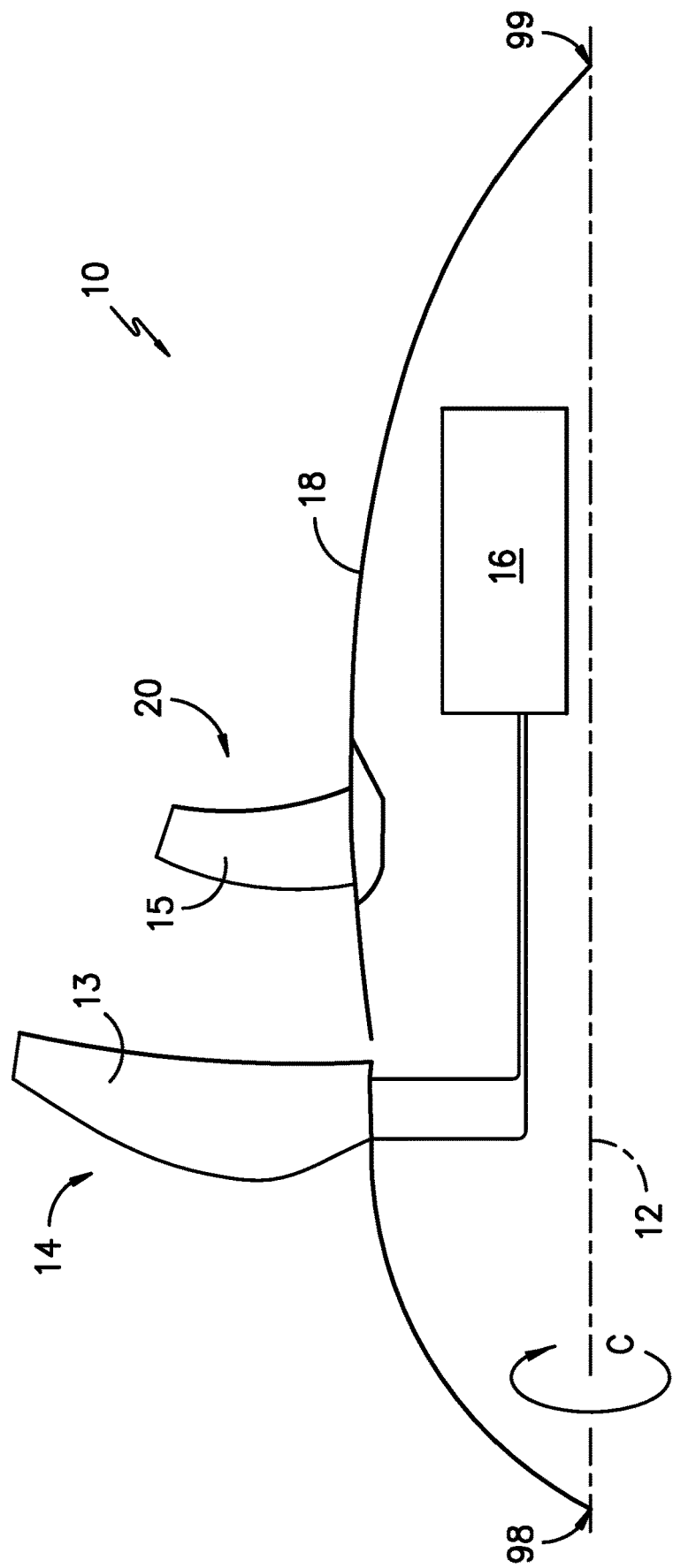
FIG. -5-

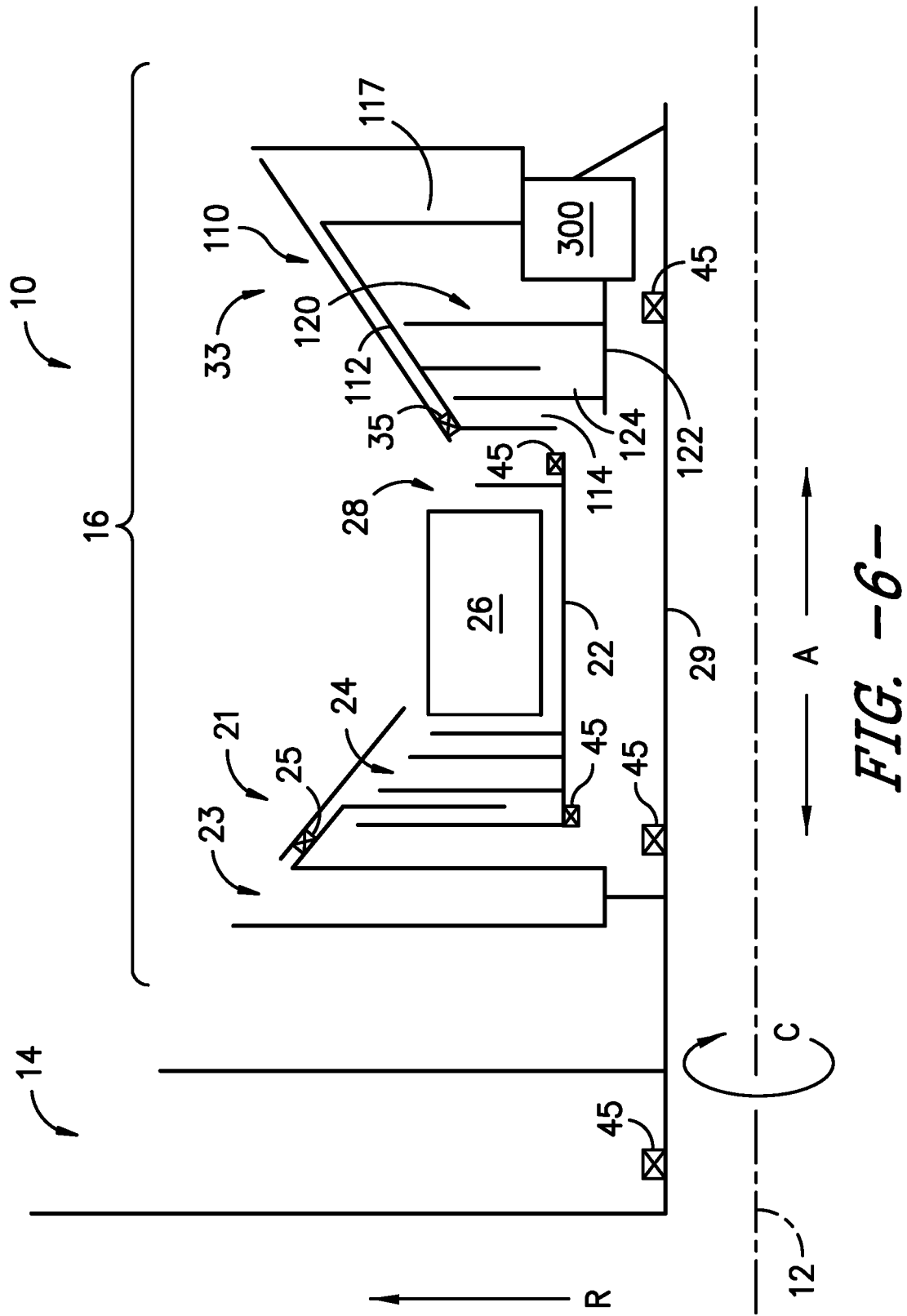
FIG. -6-

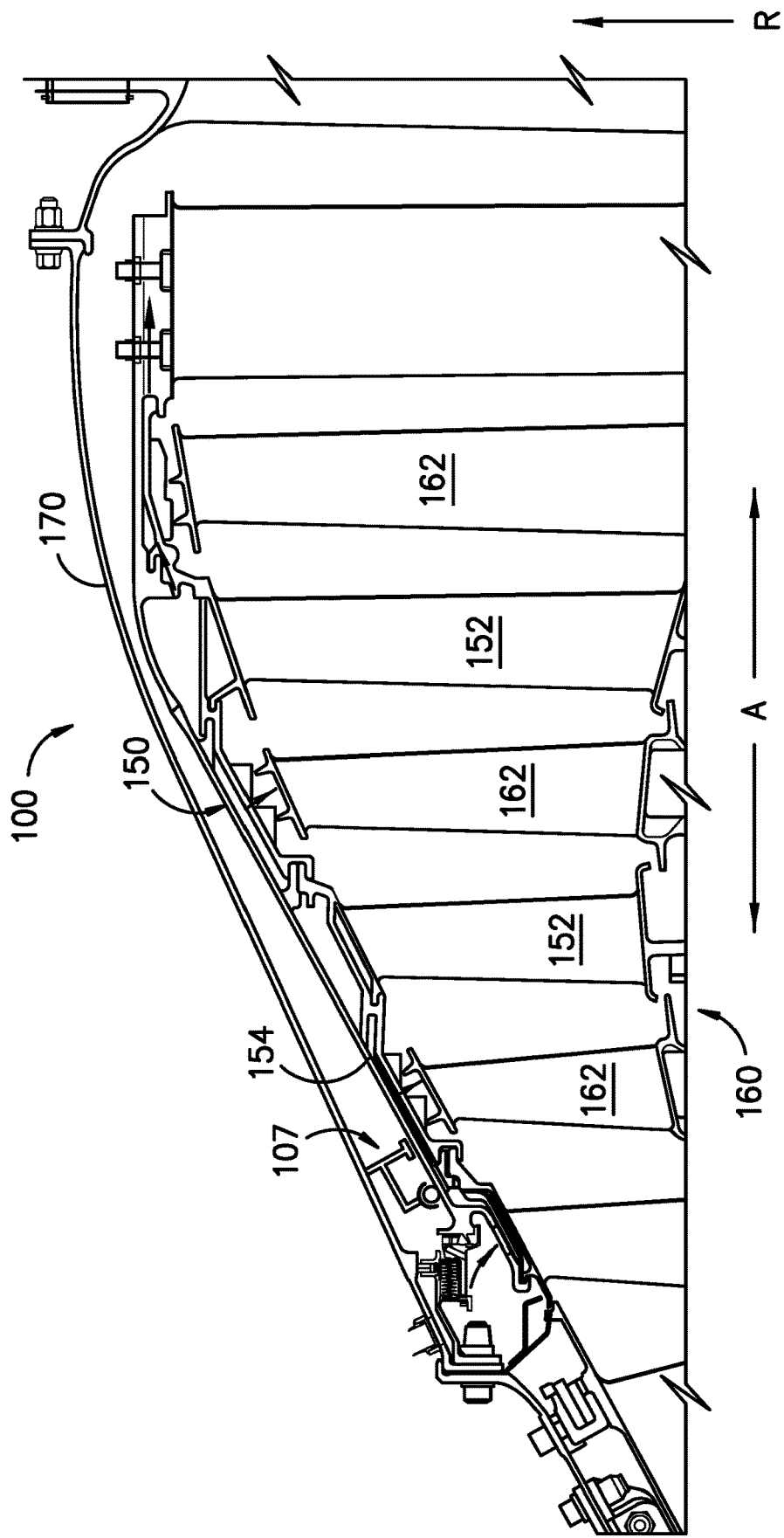
FIG. -7-

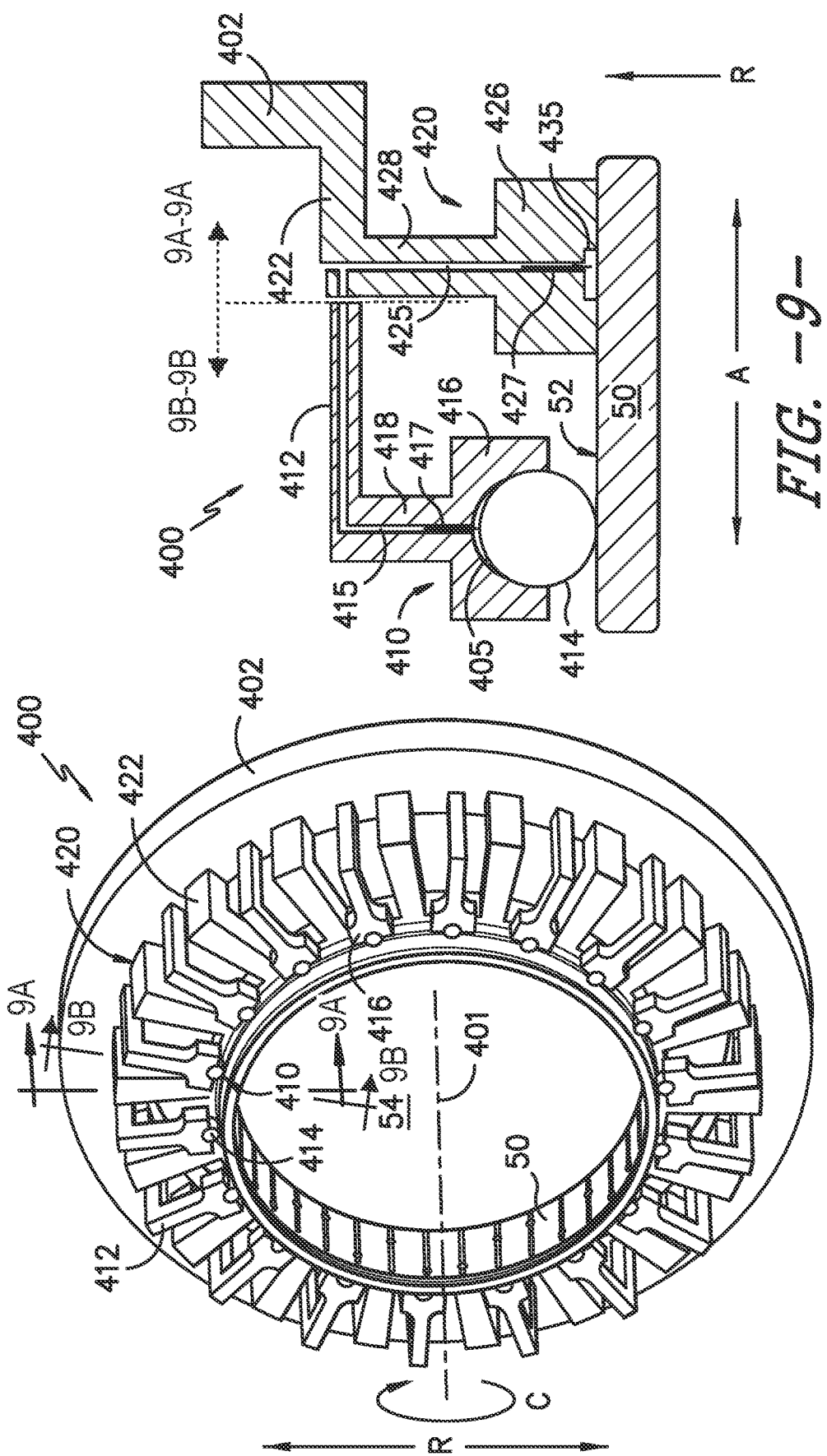

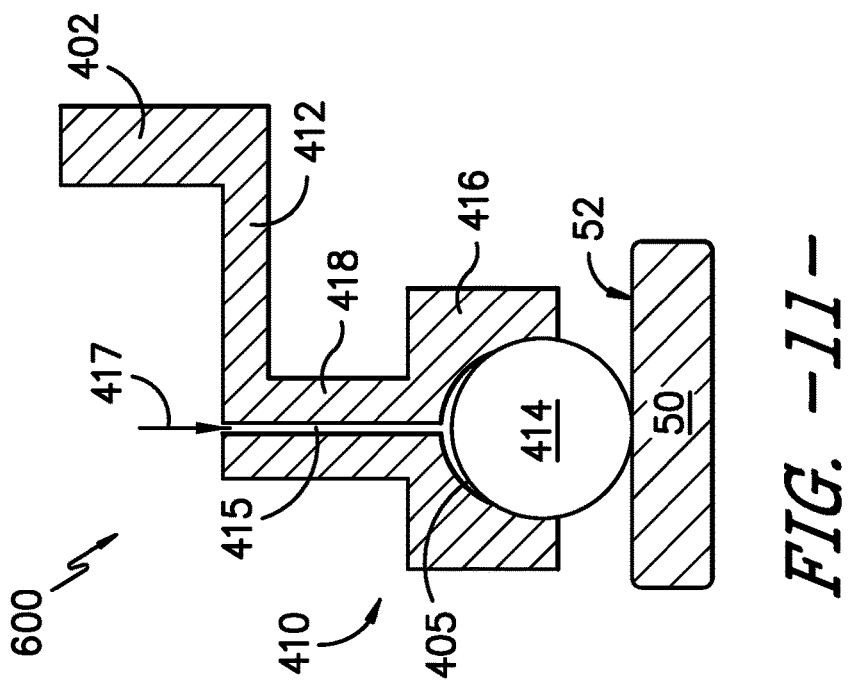
FIG. -11-
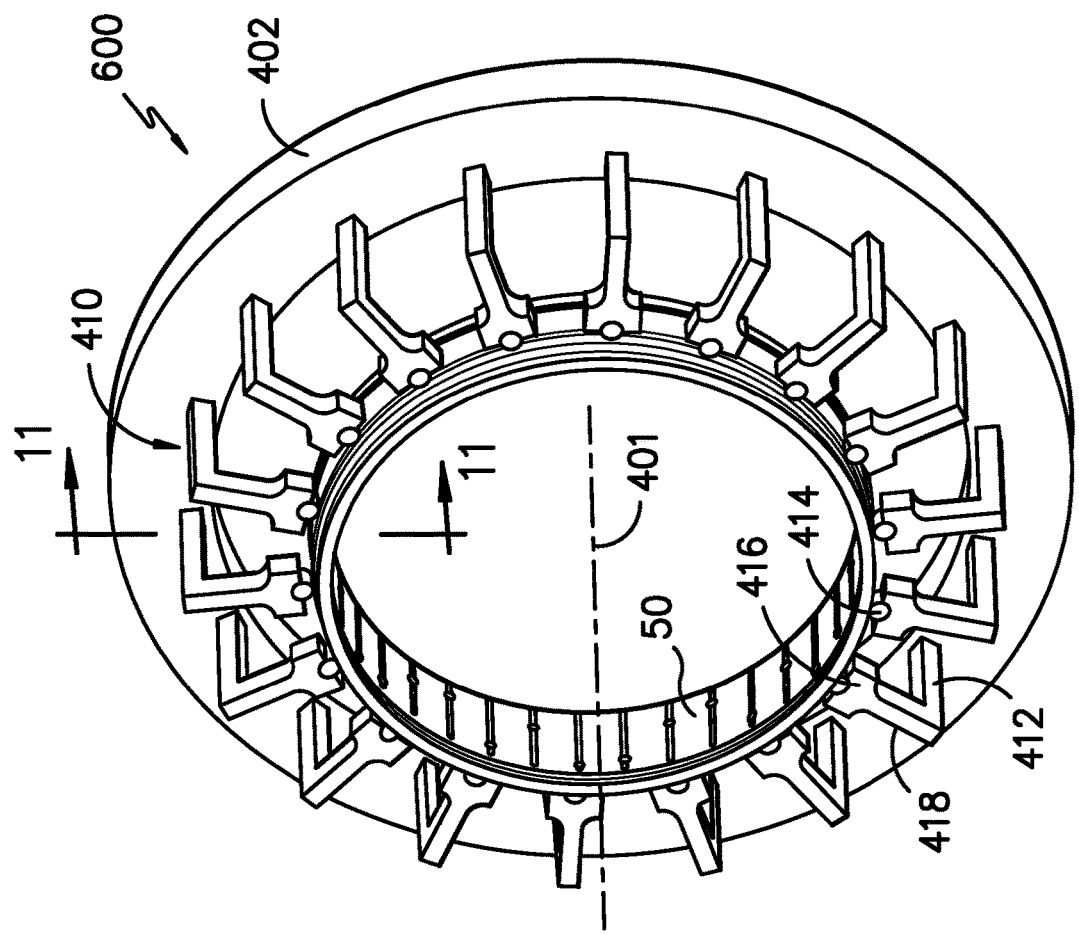
FIG. -10-

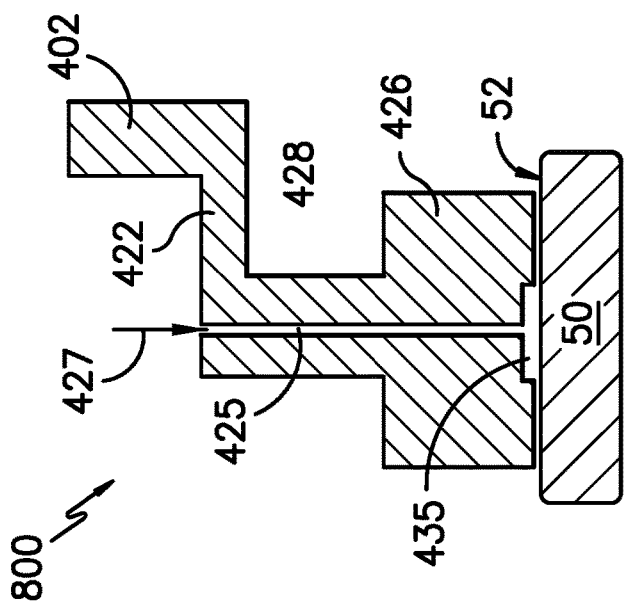
FIG. -13-
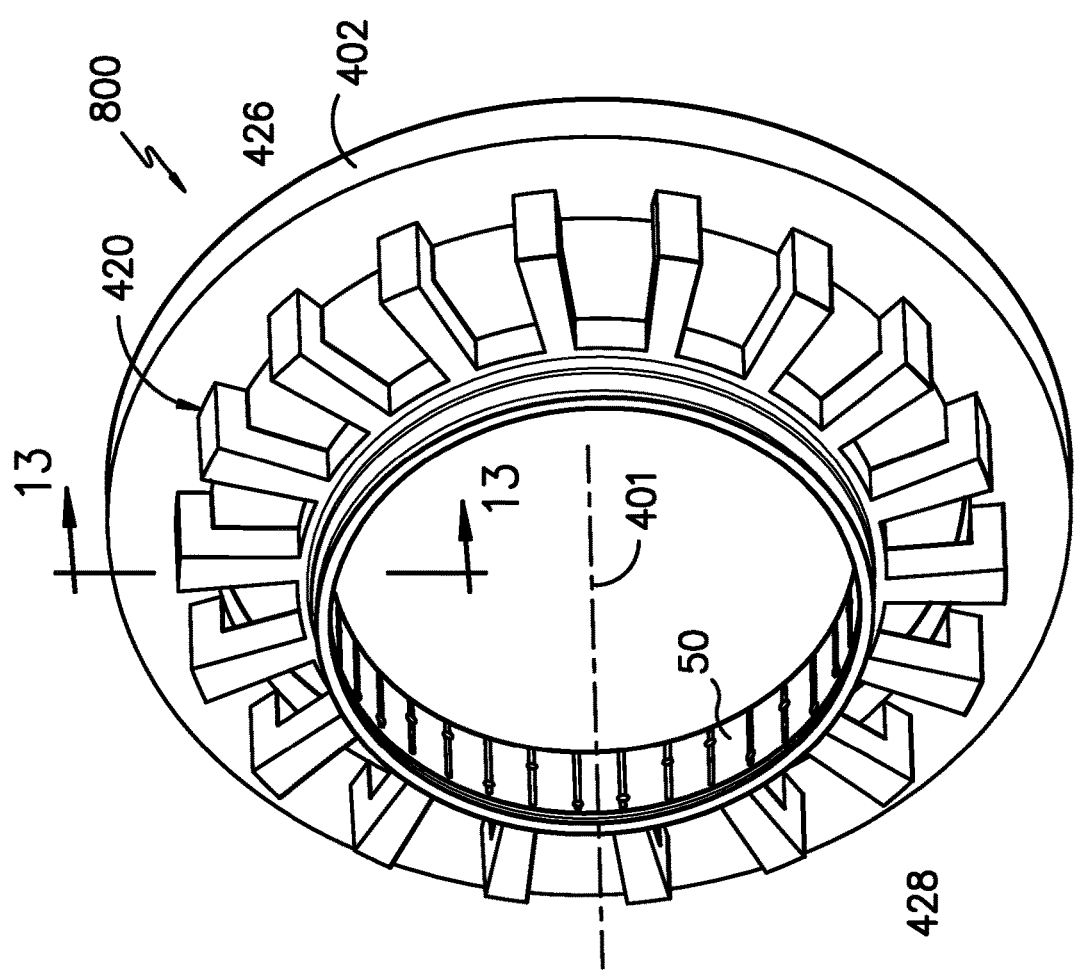
FIG. -12-

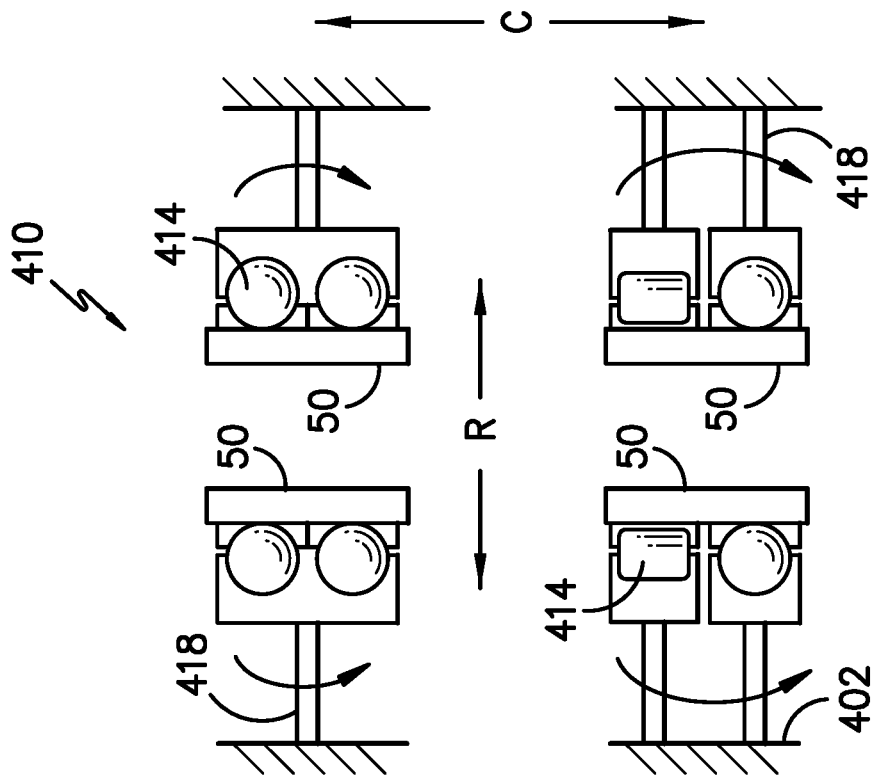
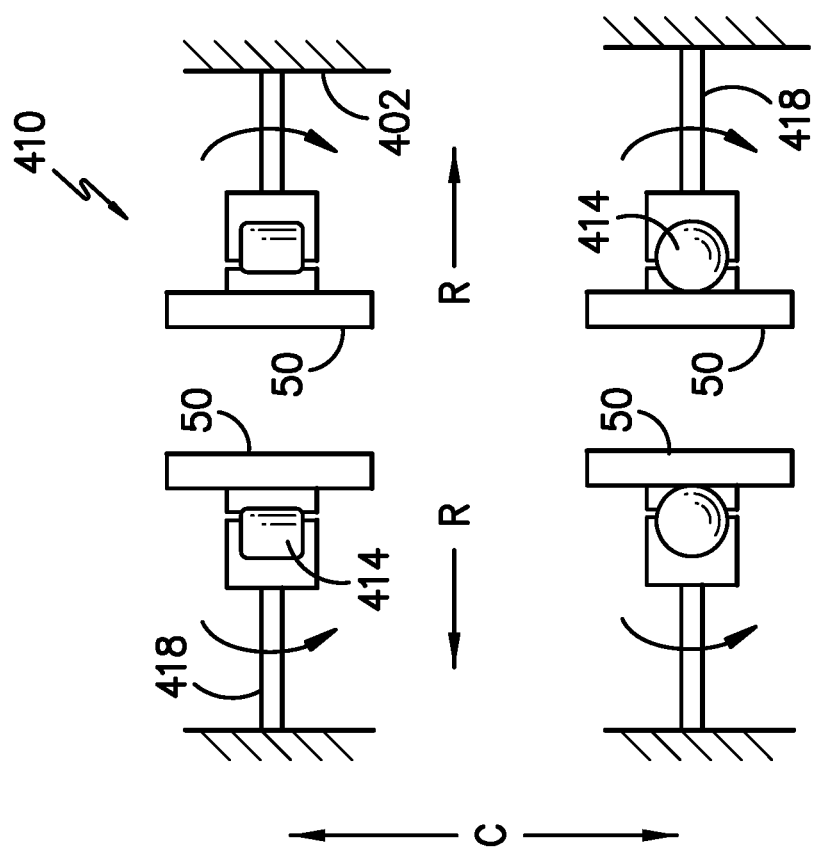

BEARING SYSTEM WITH INDEPENDENT ADAPTIVE STIFNESS SUPPORT

FIELD

The present subject matter relates generally bearing assemblies. The present subject matter relates particularly to bearing assemblies for bladed rotor assemblies.

BACKGROUND

Rotor assemblies, such as turbomachines and wind turbines, are generally challenged to operate under various rotor dynamic conditions. The rotor dynamics of a rotor assembly may be influenced by thrust output, loading, rotational speed, thermal gradients, mass, diameter, static or dynamic unbalance, or changes therein during operation of the rotor assembly. Various operating conditions may result in undesired vibration responses, whirl, unbalance, or vibration modes. Such operating conditions may generate structural stresses that may inhibit desired operation, such as desired thrust output, loading, or rotational speed, or result in reduced structural life or component failure.

While rotor assemblies are generally challenged as described above, larger-diameter or larger-mass rotor assemblies, such as wind turbines or interdigitated rotor assemblies with rotatable outer drums, are particularly challenged such as described above. There is a need for bearing assemblies that allow for improved vibration response, improved whirl stability, and are adaptable to various operating conditions.

BRIEF DESCRIPTION

Aspects and advantages of the invention will be set forth in part in the following description, or may be obvious from the description, or may be learned through practice of the invention.

An aspect of the present disclosure is directed to a bearing system configured to surround a rotor along a circumferential direction corresponding to the rotor. The rotor is extended along an axial direction co-directional to a centerline axis of the rotor. The bearing system includes a body from which a plurality of first support members is each extended, and wherein the plurality of first support members is spaced apart from one another along the circumferential direction. Each first support member includes a first axial support arm extended along the axial direction and a first radial support arm extended from the first axial support arm along a radial direction. The first radial support arm is configured to position a bearing element in contact with a bearing surface at the rotor.

Another aspect of the present disclosure is directed to a gas turbine engine having a fan assembly. The fan assembly includes a plurality of fan blades and a vane assembly. One or both of the vane assembly or the plurality of fan blades is adjustable along a respective pitch axis. A core engine is configured to drive the plurality of fan blades of the fan assembly. A bearing system is positioned at one or more of the core engine, the plurality of fan blades, or the vane assembly. The bearing system is configured to surround a rotor at the core engine or the fan assembly along a circumferential direction corresponding to the rotor. The rotor is extended along an axial direction co-directional to a centerline axis of the rotor. The bearing system includes a body from which a plurality of first support members is each extended. The plurality of first support members is spaced apart from one another along the circumferential direction. Each first support member includes a first axial support arm extended along the axial direction and a first radial support arm extended from the first axial support arm along a radial direction. The first radial support arm is configured to position a bearing element in contact with a bearing surface at the rotor.

Yet another aspect of the present disclosure is directed to a wind turbine. The wind turbine includes a tower extended from a support surface. A nacelle is mounted to the tower. A rotor is coupled to the nacelle. The rotor includes a rotatable hub and a rotor blade coupled the hub. A bearing system is positioned at one or more of the rotor or the rotor blade. The bearing system is configured to surround the rotor along a circumferential direction corresponding to the rotor. The rotor is extended along an axial direction co-directional to a centerline axis of the rotor. The bearing system includes a body from which a plurality of first support members is each extended. The plurality of first support members is spaced apart from one another along the circumferential direction. Each first support member includes a first axial support arm extended along the axial direction and a first radial support arm extended from the first axial support arm along a radial direction. The first radial support arm is configured to position a bearing element in contact with a bearing surface at the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of an exemplary embodiment of a wind turbine including a bearing system according to aspects of the present disclosure;

FIG. 2 is a schematic perspective partial cutaway view of a nacelle and rotor of the wind turbine of FIG. 1 including a bearing system according to aspects of the present disclosure;

FIG. 3 is a schematic perspective partial cutaway view of a nacelle and rotor of the wind turbine of FIG. 1 including a bearing system according to aspects of the present disclosure;

FIG. 4 is a schematic cross-sectional view of an exemplary embodiment of a turbomachine engine including a bearing system according to an aspect of the present disclosure;

FIG. 5 is a cutaway side view of an exemplary embodiment of a turbomachine engine including a bearing system according to an aspect of the present disclosure;

FIG. 6 is an exemplary schematic embodiment of the turbomachine of FIGS. 4-5 according to an aspect the present disclosure;

FIG. 7 is a detailed view of a schematic interdigitated rotor assembly of the turbomachine of FIGS. 4-6, including the bearing system according to aspects of the present disclosure;

FIG. 8 is a perspective view of an embodiment of the bearing system according to aspects of the present disclosure;

FIG. 9 is a side section view of a portion of an embodiment of the bearing system according to aspects of the present disclosure;

FIG. 10 is a perspective view of an embodiment of the bearing system according to aspects of the present disclosure;

FIG. 11 is a side section view of a portion of an embodiment of the bearing system according to aspects of the present disclosure;

FIG. 12 is a perspective view of an embodiment of the bearing system according to aspects of the present disclosure;

FIG. 13 is a side section view of a portion of an embodiment of the bearing system according to aspects of the present disclosure;

FIG. 14 is an exemplary schematic embodiment of a portion of the bearing system of FIGS. 8-11; and FIG. 15 is an exemplary schematic embodiment of a portion of the bearing system of FIGS. 8-11.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the bearing system described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of bodies, housings, support arms, passages, or other features of the bearing system having unique features, configurations, thicknesses, materials, densities, and fluid passageways, or combinations thereof that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Referring now to the drawings, FIG. 1 illustrates a perspective view of one embodiment of a conventional wind turbine 1000 that may implement aspects of the system and methodology of the present invention. The wind turbine 1000 includes a tower 1012 extending from a support surface 1014, a nacelle 1016 mounted on the tower 1012, and a rotor 1018 coupled to the nacelle 1016. The rotor 1018 includes a rotatable hub 1020 and at least one rotor blade 1022 coupled to and extending outwardly from the hub 1020. For example, in the illustrated embodiment, the rotor 1018 includes three rotor blades 1022. Each rotor blade 1022 is spaced about the hub 1020 to facilitate rotating the rotor 1018 to enable kinetic energy to be transferred from the wind into usable mechanical energy, and subsequently, electrical energy. For instance, the hub 1020 is rotatably coupled to an electric generator 1024 (FIG. 2) positioned within the nacelle 1016 for producing electrical energy.

The wind turbine 1000 may also include a wind turbine controller 1026 centralized within the nacelle 1016, or located within any other component of the wind turbine 1000, or at a location outside the wind turbine. Further, the controller 1026 may be communicatively coupled to any number of the components of the wind turbine 1000 in order to operate such components and/or to implement the pitch control function as described herein.

Referring to FIG. 2, an internal view of a conventional nacelle 1016 is illustrated. As shown, the generator 1024 is coupled to the rotor 1018 for producing electrical power from the rotational energy generated by the rotor 1018. The rotor 1018 may include a rotor shaft 1034 coupled to the hub 1020 for rotation therewith. The rotor shaft 1034, in turn, is rotatably coupled to a generator shaft 36 of the generator 1024 through a gearbox 1038. As is generally understood, the rotor shaft 1034 provides a low speed, high torque input to the gearbox 1038 in response to rotation of the rotor blades 1022 and the hub 1020. The gearbox 1038 is configured to convert the low speed, high torque input to a high speed, low torque output to drive the generator shaft 36 and, thus, the generator 1024. The wind turbine 1000 may also include a converter (not shown) configured to connect the generator 1024 to the grid and to ensure a constant energy supply. More specifically, the converter is configured to convert a predetermined torque demand into rotational power to drive the generator 1024.

The wind turbine 1000 may include one or more yaw drive mechanisms 66 communicatively coupled to the controller 1026, with each yaw drive mechanism(s) 66 configured to change the angle of the nacelle 1016 relative to the wind (e.g., by engaging a yaw bearing 68 of the wind turbine 1000).

The wind turbine 1000 includes a pitch control system wherein each rotor blade 1022 has a pitch adjustment mechanism 1032 configured to rotate each rotor blade 1022 about its pitch axis 1028 (FIG. 1). Further, each pitch adjustment mechanism 1032 may include a pitch drive motor 1040 (e.g., any suitable electric, hydraulic, or pneumatic motor), a pitch drive gearbox 1042, and a pitch drive pinion 1044. In such embodiments, the pitch drive motor 1040 may be coupled to the pitch drive gearbox 1042 so that the pitch drive motor 1040 imparts mechanical force to the pitch drive gearbox 1042. Similarly, the pitch drive gearbox 1042 may be coupled to the pitch drive pinion 1044 for rotation therewith. The pitch drive pinion 1044 may, in turn, be in rotational engagement with a pitch bearing 1046 coupled between the hub 1020 and a corresponding rotor blade 1022 such that rotation of the pitch drive pinion 1044 causes rotation of the pitch bearing 1046. Thus, in such embodiments, rotation of the pitch drive motor 1040 drives the pitch drive gearbox 1042 and the pitch drive pinion 1044, thereby rotating the pitch bearing 1046 and the rotor blade 1022 about the pitch axis 1028. The pitch control system is controlled by the controller 1026 to pitch the blades 1022 as a function of various control and power generating parameters. In certain embodiments, the power for the pitch control system, and the drive motors 40 in particular, is supplied from the downstream grid.

FIG. 3 provides a partial cutaway perspective view inside a rotor 1018 for the exemplary wind turbine 1000 of FIGS. 1-2. Positioned at the rotor shaft 1034 is a bearing system 105 configured such as depicted and described in one or more embodiments in regard to FIGS. 8-15.

Referring now to the drawings, FIGS. 4-5 are exemplary embodiments of an engine 10 including an interdigitated turbine assembly according to aspects of the present disclosure. The engine 10 includes a fan assembly 14 driven by a core engine 16. The core engine 16 is encased in an outer casing 18. In various embodiments, the core engine 16 is generally a Brayton cycle system configured to drive the fan assembly 14. However, in other embodiments, the fan assembly 14 may be driven by a core engine configured as a pressure-rise system or a hybrid-electric system including an electric powertrain with one or more electric machines, energy storage devices, motor/generators, or controllers. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13 to provide thrust, control thrust vector, abate or re-direct undesired acoustic noise, or otherwise desirably alter a flow of air relative to the fan blades 13.

In certain embodiments, such as depicted in FIGS. 4-5, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13. In certain embodiments, such as depicted at FIG. 5, the adjustable pitch fan blades 13 may control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above. In certain embodiments, pitch control mechanisms at one or both of the fan assembly 14 or the vane assembly 20 include embodiments of the bearing system further described herein.

In various embodiments, such as depicted in FIG. 4, the engine 10 is a ducted thrust producing system. The engine 10 may be configured as a turbofan with a nacelle or fan casing 54 surrounding the plurality of fan blades. 13. In certain embodiments, such as depicted in FIG. 5, the engine 10 is an un-ducted thrust producing system, such that the plurality of fan blades 13 is unshrouded by a nacelle or fan casing. As such, in various embodiments, the engine 10 may be configured as an unshrouded turbofan engine, an open rotor engine, or a propfan engine. In particular embodiments, the engine 10 is a single unducted rotor engine including a single row of fan blades 13.

The engine 10 may be configured as a low-bypass or high-bypass engine having suitably sized fan blades 13. The engine 10 configured as an open rotor engine may include the fan assembly 14 having large-diameter fan blades 13, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally high cruise speed than aircraft with turboprop engines), and/or relatively low rotational speeds. Cruise altitude is generally an altitude at which an aircraft levels after climb and prior to descending to an approach flight phase.

Referring now to FIG. 6, an exemplary schematic embodiment of the core engine 16 is provided. The core engine 16 includes a compressor section 21, a heat addition system 26, and a turbine section 33 together in serial flow arrangement. The core engine 16 is extended circumferentially relative to an engine centerline axis 12. The core engine 16 includes a high-speed spool that includes a high-speed compressor 24 and a high-speed turbine 28 operably rotatably coupled together by a high-speed shaft 22. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIG. 6, the core engine 16 includes a booster or low-speed compressor 23 positioned in flow relationship with the high-speed compressor 24. The low-speed compressor 23 is rotatably coupled with the turbine section 33 via a driveshaft 29. Various embodiments of the turbine section 33 further include a turbine rotor assembly 100 including a second rotor assembly 120 and a first rotor assembly 110 interdigitated with one another. The second rotor assembly 120 and the first rotor assembly 110 are each operably connected to a gear assembly 300 to provide power to the fan assembly 14 and the low-speed compressor 23, such as described further herein. In certain embodiments, the second rotor assembly 120 and the first rotor assembly 110 are together positioned downstream of the high-speed turbine 28.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

In certain embodiments, such as depicted in FIG. 6, the core engine 16 includes one or more interdigitated structures at the compressor section 21 and/or the turbine section 33. In one embodiment, the turbine section 33 includes a turbine rotor assembly including the first rotor assembly 110 interdigitated with the second rotor assembly 120, such as via a rotating outer shroud, drum, casing, or rotor. It should be appreciated that embodiments of the turbine section 33 may include the first and/or second turbine 110, 120 interdigitated with one or more stages of the high-speed turbine 28. In another embodiment, the compressor section 21 includes the low-speed compressor 23 interdigitated with the high-speed compressor 24. For instance, the higher speed compressor, such as the high-speed compressor 24, may be a first compressor interdigitated with the lower speed compressor, such as the low-speed compressor 23.

Various embodiments of the engine 10 provided in FIGS. 4-7 further include a bearing system positioned at one or more of the compressor section 21 or the turbine section 33. In certain embodiments, a bearing system 45 is positioned at a shaft, such as the high-speed shaft 22 or the driveshaft 29. The bearing system 45 may be positioned at one or more locations or stations at the engine 10, such as at a forward driveshaft bearing or referred to as a number 1 or number 2 bearing; or at a forward high-speed shaft bearing or referred to as a number 3 bearing; or at an aft high-speed shaft bearing or referred to as a number 4 bearing; or at an aft driveshaft bearing or referred to as a number 5 or number 6 bearing. In other embodiments, the bearing system may be positioned at an outer diameter of an interdigitated rotor assembly, such as depicted schematically in FIG. 6 at the compressor section 21 at bearing system 25, or at the turbine section 33 at bearing system 35. In various embodiments, the bearing system 25, 35, 45 is configured as one or more of the bearing system depicted and described herein at FIGS. 8-15.

Referring briefly to FIG. 8, an exemplary schematic view of a portion of an interdigitated rotor assembly 100 including an outer diameter bearing assembly 107 is provided. In one embodiment, the interdigitated rotor assembly 100 may be configured as the compressor section 21 including the low-speed compressor 23 and/or the high speed compressor 24, such as depicted in FIG. 6. In other embodiments, the outer diameter bearing assembly 107 may be positioned at any combination of interdigitated compressors not depicted herein, such as combinations of low-speed, intermediate-speed, or high-speed compressors or fan assemblies. In another embodiment, the interdigitated rotor assembly 100 may be configured as the turbine section 33 including the first rotor assembly 110 and the second rotor assembly 120. In other embodiments, the outer diameter bearing assembly 107 may be positioned at any combination of interdigitated turbines not depicted herein, such as combinations of high-speed, intermediate-speed, or low-speed turbines.

Referring again to FIG. 7, the interdigitated rotor assembly 100 generally includes an outer drum rotor assembly 150 interdigitated with an inner rotor assembly 160. The outer drum rotor assembly 150 has a plurality of outer drum rotor blades 152 attached and extended inward along the radial direction R from a rotatable outer drum or shroud 154. The inner rotor assembly 160 has a plurality of inner rotor blades 162 extended outward along the radial direction R from a disk or drum. A static or stationary casing 170 surrounds the outer drum rotor assembly 150. The outer diameter bearing assembly 107 is positioned between the casing 170 and the outer drum rotor assembly 150. As further described herein, the stationary or static portions of the bearing assembly described herein in regard to FIGS. 8-15 are operably coupled to the casing 170. In regard to the embodiment in FIG. 8, the rotor depicted in FIGS. 8-15 is generally the outer drum 154 of the interdigitated rotor assembly 100.

Although depicted as an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines, such as turbofan, turboprop, or turboshaft engines with reduction gear assemblies.

Referring now to FIG. 8, an embodiment of a bearing system 400 in accordance with aspects of the present disclosure is provided. The bearing system 400 includes a body 402 from which a first support member 410 and a second support member 420 are each extended. In a particular embodiment, the body 402 is an annular static structure extended along a circumferential direction C relative to a centerline axis 401. The body 402 is formed to surround a rotor 50 extended through an opening 54. The opening 54 is formed through the body 402 along an axial direction A and inward along a radial direction R of the first support member 410 and the second support member 420.

In various embodiments, a plurality of the first support member 410 and the second support member 420 are in alternating arrangement along the circumferential direction C. In certain embodiments, the bearing system 400 includes three or more of the first support member 410. In still certain embodiments, the bearing system 400 includes three or more of the second support member 420. Referring to the side view of the bearing system 400 provided in FIG. 9, providing the section views 9A-9A and 9B-9B indicated in FIG. 8, the first support member 410 and the second support member 420 are adjacent to one another along the axial direction A. Referring to FIG. 8 and FIG. 9 together, the plurality of the first support member 410 and the second support member 420 are each in alternating arrangement along the circumferential direction C and offset from one another along the axial direction A.

Referring to FIG. 9, and furthermore depicted in the embodiment in FIG. 11, the first support member 410 includes a first axial support arm 412 extended along the axial direction A and a first radial support arm 418 extended along the radial direction R. The first radial support arm 418 positions a bearing element 414 in contact with a bearing surface 52 at the rotor 50. In some embodiments, the bearing surface 52 is a bearing race configured specifically for receiving contact with the bearing element 414. In certain embodiments, the bearing surface 52 is an inner bearing race separable from the rotor 50. A first housing 416 surrounds the bearing element 414, such as to substantially constrain the bearing element 414 along the axial direction A, the circumferential direction C, or both. The first housing 416 and the bearing surface 52 together may house or contain the bearing element 414. The bearing system may connect to the rotor 50 by connecting the bearing surface 52 to the rotor 50.

In certain embodiments, the first radial support arm 418 is extended from the first axial support arm 412 at an approximately 90 degree angle when the rotor 50 is in static condition (e.g., not rotating, not during rotor operation). In a particular embodiment, the first radial support arm 418 is extended from a distal end of the first axial support arm 412 relative to the body 402.

In a particular embodiment of the bearing system 400, each bearing element 414 is constrained by a respective first housing 416. In various embodiments, each first support member 410 is fixed to the body 402 and detached or separate from direct contact from other first support members 410 of the plurality of first support members.

In various embodiments, the bearing element 414 is a rolling bearing element. The rolling bearing element includes one or more of a spherical ball bearing, a cylindrical roller bearing, a tapered roller bearing, a needle bearing, or other appropriate rolling element configured to receive and transmit loads from the rotor 50.

A first passage 415 is formed within the first support member 410 to provide a first flow of fluid 417 to a first cavity 405. The first cavity 405 is formed within the first housing 416. Furthermore, the first cavity 405 is formed between the bearing element 414 and the first housing 416. In various embodiments, such as depicted in FIG. 9 and FIG. 11, the first passage 415 is formed within the first radial support arm 418 of the first support member 410. In certain embodiments, such as depicted in FIG. 9, the first passage 415 is furthermore formed within the first axial support arm 412 of the first support member 410.

Referring still to FIG. 9, and furthermore depicted in the embodiment in FIG. 13, the second support member 420 includes a second axial support arm 422 extended along the axial direction A and a second radial support arm 428 extended along the radial direction R. The second radial support arm 428 positions a second housing 426 in operable arrangement next to the rotor 50. In various embodiments, each second support member 420 is fixed to the body 402.

A second passage 425 is formed within the second support member 420 to provide a second flow of fluid 427 to a second cavity 435. The second cavity 435 is formed within the second housing 426. Furthermore, the second cavity 435 is formed at the second housing 426 and directly adjacent or next to the bearing surface 52 of the rotor 50. In various embodiments, such as depicted in FIG. 9 and FIG. 13, the second passage 425 is formed within the second radial support arm 428 of the second support member 420. In particular, operable arrangement of the second housing 426 adjacent to the rotor 50 forms a hydrostatic or fluid film bearing at a cavity 435 between the second housing 426 and the rotor 50. In a particular embodiment, such as depicted in FIG. 8, the plurality of second support members 420 is coupled to one another via the second housing 426 extended along the circumferential direction C, such as to surround the rotor 50. In certain embodiments, the second cavity 435 is an annular passage formed between the second housing 426 extended annularly along the circumferential direction C and the rotor 50.

In certain embodiments, the second radial support arm 428 is extended from the second axial support arm 422 at an approximately 90 degree angle when the rotor 50 is in static condition (e.g., not rotating, not during rotor operation). In a particular embodiment, the second radial support arm 428 is extended from a distal end of the second axial support arm 422 relative to the body 402.

As described above in regard to FIG. 8 or FIG. 9, the plurality of the first support member 410 and the plurality of the second support member 420 are each positioned or formed in adjacent arrangement along the circumferential direction C, the axial direction A, or both. The embodiment in FIG. 9 further depicts the first housing 416 positioned distal from the body 402 along the axial direction A relative to the second housing 426 positioned proximate to the body 402 along the axial direction A.

During operation of the bearing system 400, such as during rotor 50 loading and operation, the first support member 410 may each act as a spring support with the bearing element 414, such as to provide improved load distribution between the bearing system 400 and the rotor 50. The first axial support arm 412, the first radial support arm 418, and the first housing 416 separate from circumferentially adjacent first support members 410 may collectively allow for improved load distribution, improved deflection of the bearing element 414, or minimized ovalization of the bearing system 400. The independent first support members 410 may each act as spring supports to allow for the bearing element 414 to maintain contact with the rotor 50. In certain embodiments, the first support members 410 are pre-strained spring beams allowing for placing the bearing element 414 in desired contact with the rotor 50.

The substantially independent second support members 420 may allow for benefits similar to the first support members 410. The second support members 420, such as with an annularly extended second housing 426 surrounding the rotor 50 and forming the fluid bearing at the second cavity 435, may further provide improved damping relative to the configuration of the first support member 410. The plurality of second support members 420 may furthermore generate less heat than the plurality of first support members 410. Still further, the plurality of second support members 420 may furthermore allow for much higher load capability relative to the plurality of first support members 410.

The independent first support members 410 may allow for variable or circumferentially localized stiffnesses allowing for improved load distribution, even load distribution, and bending or pitching flexure relative to the plurality of second support members 420. The first support members 410 may particularly provide improved dynamic responses and load distribution relative to high rotor unbalance, rotor bow (e.g., bowed rotor start), or events during operation that may induce high rotor unbalance (e.g., rotor blade-out, rotor blade liberation or other blade damage, domestic or foreign object debris ingestion, icing ingestion, or damper system failure).

Referring briefly to FIG. 10, an embodiment of a bearing system 600 is provided including the plurality of first support members 410 such as described in regard to the bearing system 400 in FIG. 8 and FIG. 9. The bearing system 600 is configured substantially similarly to the bearing system 400 with regard to the plurality of first support members 410 and the bearing element 414. FIG. 11 provides a side cross-sectional view of the first support member 410, the body 402, and the rotor 50 at section 11-11 in FIG. 10. The embodiment provided in FIG. 11 may be configured substantially such as depicted in FIG. 9 and described herein.

Referring briefly to FIG. 12, an embodiment of a bearing system 800 is provided including the plurality of second support members 420 such as described in regard to the bearing system 400 in FIG. 8 and FIG. 9. The bearing system 800 is configured substantially similarly to the bearing system 400 with regard to the plurality of second support members 420 and the fluid bearing formed by the second housing 426. FIG. 13 provides a side cross-sectional view of the second support member 420, the body 402, and the rotor 50 at section 13-13 in FIG. 12. The embodiment provided in FIG. 13 may be configured substantially such as depicted in FIG. 9 and described herein.

The bearing system 600 including the plurality of first support members 410 may be particularly beneficial for lower-speed or lower-load operating conditions relative to bearing system 800 including the plurality of second support members 420. Furthermore, the bearing system 800 may be particularly beneficial for higher-speed or higher-load operating conditions relative to bearing system 600. Referring back to FIG. 8 and FIG. 9, embodiments of the bearing system 400 are configured to position the first support member 410 for a first engagement corresponding to a low-speed or low-load operating condition (e.g., initial start-up or motoring, ignition, idle operating condition, part-load condition, etc.) relative to the second support member 420 configured for a second engagement corresponding to a high-speed or high-load operating condition (e.g., maximum or full-load condition, takeoff or cruise conditions, etc.).

Referring now to FIG. 14 and FIG. 15, exemplary schematic embodiments are provided depicting loading of the plurality of independent first support members 410. The first support members 410 are configured substantially similarly as depicted and described with regard to FIG. 8, FIG. 9, FIG. 10, and FIG. 11. The schematics depict the plurality of independent first support members allowing for flex in bending or pitching while providing rigidity along the radial direction R. In certain embodiments, such as depicted in FIG. 14, one or more of the first support members 410 may include a cylindrical rolling bearing element 414, such as particularly for loads along the radial direction R, and one or more of the first support members 410 may include a ball or spherical rolling bearing element 414, such as particularly for loads along the radial direction R, the axial direction A, and moments along a tangential direction. In another embodiment, such as depicted in FIG. 15, the first support member 410 may be configured to receive a double-bearing element, such as a pair of ball or spherical rolling bearing elements, or combinations of rolling bearing elements provided herein, within a single respective first housing 416.

The first flow of fluid 417 (FIG. 9, FIG. 11) received through the first support member 410 may include any fluid appropriate for operating a rolling bearing element. Particular embodiments define the first flow of fluid 417 as air, such as pressurized compressor discharge air, such as downstream of a high pressure compressor (e.g., Station 3), or between a high pressure compressor and a low- or intermediate pressure compressor (e.g., Station 2.5), or compressed air from bled from one or more stages at a compressor section, or other appropriate compressed fluid source.

The second flow of fluid 427 (FIG. 9, FIG. 13) received through the second support member 420 may include any fluid appropriate for operating a hydrostatic or fluid bearing. Particular embodiments define the second flow of fluid 427 as air, such as the one or more sources from which the first flow of fluid 417 is derived. The first and second flows of fluid 417, 427 may be commonly derived and separated for providing to the respective first support member 410 and the second support member 420 (e.g., FIG. 8, FIG. 9). In other embodiments, the second flow of fluid 427 is lubricant, hydraulic fluid, or other appropriate hydrodynamic fluid for a generating a fluid bearing at the second cavity 435.

In still various embodiments, the first support member 410 is formed of a first material different from a second material forming the second support member 420. The first material and the second material may include combinations of shape memory alloys; metal, ceramic or polymer matrix composite materials; or metal and alloys thereof. The bearing systems provided herein allow for variable stiffness control via the different first material and second material, different flow conditions of fluid 417, 427, or combinations thereof. In one embodiment, the flows of fluid 417, 427 defining common temperatures may affect stiffness at the first support member formed from the first material different from the second support stiffness formed from the second material. In another embodiment, the first support member and the second support member provide different stiffnesses via different temperatures of the separate flows of fluid through the respective support members. The stiffnesses along the axial direction A, the circumferential direction C, or moment loads may be varied at separate locations via independent articulation of the flow conditions (e.g., temperature, pressure, flow rate, etc.) of the flows of fluid through the respective support members.

It should be appreciated that the rotor 50 depicted in FIGS. 8-15 may include the high-speed shaft 22 or the driveshaft 29 of the engine 10 depicted in FIGS. 4-6, the first rotor assembly 110 of the interdigitated turbine rotor assembly, the compressor 23 at the interdigitated compressor rotor assembly in FIG. 3, the rotor shaft 1034 of the wind turbine 1000 depicted in FIGS. 1-3, or rotor blade 1022 of the wind turbine 1000 and pitch adjustment mechanism. Various embodiments of the rotor 50 may include rotatable drums or shrouds of an interdigitated compressor section 21 or interdigitated turbine section 33, fan shafts, or other rotatable shafts, drums, or rotors of a turbomachine, wind turbine, or other turbine system.

Embodiments of the bearing system provided herein are configured as independent rolling bearing elements allowing for adaptive stiffness. Independent support arms configured as spring members are integrated with the bearing elements to allow for localized movements, adjustment, or other compliance, allowing for improved load distribution and mitigated ovalization of the bearing system, rotor, or shaft. The independent support arms allow the independent rolling bearing elements to maintain constant or substantially constant contact with the rotor or shaft. The independent support arms may further include shape memory alloys to provide improved damping and stiffness adaptability. Still further, the independent support arms may vary circumferentially, such as to be arranged in dissimilar or asymmetric circumferential arrangement. Embodiments of the bearing system provided herein allow for improved rotor dynamic responses, improved rotor stability, and improved accommodations for bearing-to-rotor misalignment, such as via non-axisymmetric and/or non-uniform stiffness of the plurality of individual bearing support arms.

Embodiments of the bearing system provided herein may provide benefits particular to wind turbines such as provided herein. Known pitch bearings are generally susceptible to failures at high moment loads. Relatively slow speed operation of the wind turbine and relatively limited pitching may result in high loads that may cause failure in known pitch bearings. Embodiments of the bearing system provided herein may provide benefits particular to gas turbine engine fan pitch control mechanisms, such as described in regard to wind turbine pitch controls.

Embodiments of the bearing system provided herein may provide benefits particular to gas turbine engines such as provided herein. The bearing system may be positioned such as described herein at one or more bearing locations as may be known in the art at two-spool or three-spool gas turbine engines. The bearing system may provide benefits particular to interdigitated gas turbine engines, such as at an outer diameter bearing at a rotatable outer drum or outer shroud of the compressor section or turbine section. Embodiments of the bearing system provided herein may provide benefits such as mitigating whirl, undesired rotor dynamics, unbalance, or other rotor dynamics or stability issues particular to interdigitated rotor structures, such as counter-rotating turbine or compressor rotors, propfan or open-rotor structures, or large-diameter rotor drums with inwardly radially extending airfoils generally.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A bearing system, the bearing system configured to surround a rotor along a circumferential direction corresponding to the rotor, wherein the rotor is extended along an axial direction co-directional to a centerline axis of the rotor, the bearing system comprising a body from which a plurality of first support members is each extended, and wherein the plurality of first support members is spaced apart from one another along the circumferential direction; wherein each first support member comprises a first axial support arm extended along the axial direction and a first radial support arm extended from the first axial support arm along a radial direction, and wherein the first radial support arm is configured to position a bearing element in contact with a bearing surface at the rotor.

2. The bearing system of any clause herein, wherein the first axial support arm is extended from the body, and wherein the first radial support arm is extended from the first axial support arm distal along the axial direction from the body.

3. The bearing system of any clause herein, wherein the first radial support arm is extended from the first axial support arm at an approximately 90 degree angle when the rotor is in static condition.

4. The bearing system of any clause herein, wherein each first support member comprises a first housing connected to the first radial support arm, wherein the first support member is configured to position the bearing element in operable contact with the first housing and the bearing surface at the rotor.

5. The bearing system of any clause herein, wherein a first cavity is formed between the first housing and the bearing element.

6. The bearing system of any clause herein, wherein a first passage is formed within the first support member, and wherein the first passage is in fluid communication with the first cavity.

7. The bearing system of any clause herein, wherein the first housing at each respective first support member is detached from one another.

8. The bearing system of any clause herein, the bearing system comprising a plurality of second support members each extended from the body, wherein each second support member is positioned in alternating arrangement along the circumferential direction with the plurality of first support members.

9. The bearing system of any clause herein, wherein each second support member comprises a second axial support arm extended along the axial direction; a second radial support arm extended from the second axial support arm along the radial direction toward the rotor.

10. The bearing system of any clause herein, wherein a second housing is connected to the second radial support arm, wherein the second radial support arm positions the second housing in operable arrangement next to the rotor to form a fluid film bearing between the second housing and the rotor.

11. The bearing system of any clause herein, wherein the second support member positions the second housing to form a second cavity between the second housing and the rotor, and wherein a second passage is formed within the second support member in fluid communication with the second cavity.

12. The bearing system of any clause herein, wherein the second axial support arm positions the second housing proximate to the body along the axial direction relative to the first housing at the first support member.

13. The bearing system of any clause herein, wherein the second housing is extended along the circumferential direction to surround the rotor, and wherein the second housing is connected to the second radial support arm at each of the plurality of second support members.

14. The bearing system of any clause herein, wherein the first support member comprises a first material, and wherein the second support member comprises a second material different from the first material.

15. The bearing system of any clause herein, wherein the first material and the second material comprise a shape memory alloy, a metal matrix composite material, ceramic matrix composite material, a polymer matrix composite material, metal, a metal alloy, or combinations thereof.

16. The bearing system of any clause herein, wherein the bearing element is one or more of a spherical ball bearing, a cylindrical roller bearing, a tapered roller bearing, a needle bearing, or combinations thereof.

17. The bearing system of any clause herein, wherein each first support member comprises a first housing connected to the first radial support arm, wherein the first support member is configured to position the bearing element in operable contact with the first housing and the bearing surface at the rotor, and wherein each first housing is configured to receive a pair of the bearing element.

18. The bearing system of any clause herein, wherein the bearing surface is an inner bearing race extended along the circumferential direction.

19. A gas turbine engine, the gas turbine engine comprising a fan assembly, wherein the fan assembly comprises a plurality of fan blades and a vane assembly, wherein one or both of the vane assembly or the plurality of fan blades is adjustable along a respective pitch axis; a core engine configured to drive the plurality of fan blades of the fan assembly; and a bearing system positioned at one or more of the core engine, the plurality of fan blades, or the vane assembly, wherein the bearing system is configured to surround a rotor at the core engine or the fan assembly along a circumferential direction corresponding to the rotor, wherein the rotor is extended along an axial direction co-directional to a centerline axis of the rotor, wherein the bearing system comprises a body from which a plurality of first support members is each extended, and wherein the plurality of first support members is spaced apart from one another along the circumferential direction, and wherein each first support member comprises a first axial support arm extended along the axial direction and a first radial support arm extended from the first axial support arm along a radial direction, and wherein the first radial support arm is configured to position a bearing element in contact with a bearing surface at the rotor.

20. A wind turbine, the wind turbine comprising a tower extended from a support surface; a nacelle mounted to the tower; a rotor coupled to the nacelle, wherein the rotor includes a rotatable hub and a rotor blade coupled the hub; and a bearing system positioned at one or more of the rotor or the rotor blade, wherein the bearing system is configured to surround the rotor along a circumferential direction corresponding to the rotor, wherein the rotor is extended along an axial direction co-directional to a centerline axis of the rotor, wherein the bearing system comprises a body from which a plurality of first support members is each extended, and wherein the plurality of first support members is spaced apart from one another along the circumferential direction, and wherein each first support member comprises a first axial support arm extended along the axial direction and a first radial support arm extended from the first axial support arm along a radial direction, and wherein the first radial support arm is configured to position a bearing element in contact with a bearing surface at the rotor.

What is claimed is:

1. A bearing system, the bearing system configured to surround a rotor along a circumferential direction corresponding to the rotor, wherein the rotor is extended along an axial direction co-directional to a centerline axis of the rotor, the bearing system comprising:
    a body;
    a plurality of first support members; and
    a plurality of first housings;
    wherein each of the plurality of first support members extends from the body to a respective one of the plurality of first housings, wherein the plurality of first support members are spaced apart from one another along the circumferential direction, wherein the plurality of first housings are spaced apart from one another along the circumferential direction,
    wherein each of the plurality of first support members comprises:
        a first axial support arm extended from the body along the axial direction; and
        a first radial support arm extended toward the centerline axis from the first axial support arm along a radial direction; and
    wherein each of the plurality of first housings includes a bearing element, wherein each bearing element is configured to be in contact with a bearing surface at the rotor.

2. The bearing system of claim 1, wherein the first radial support arm of each of the plurality of first support members is aligned in the radial direction with a respective one of the plurality of first housings.

3. The bearing system of claim 2, wherein for each first support member the first radial support arm is extended from the first axial support arm at a 90 degree angle with respect to the first axial support arm when the rotor is in static condition.

4. The bearing system of claim 1, wherein each of the plurality of first housings include a first cavity that is configured to receive the bearing element.

5. The bearing system of claim 4, wherein each of the plurality of first support members includes a first passage in fluid communication with the first cavity of a respective one of the plurality of first housings.

6. The bearing system of claim 1, comprising:
    a plurality of second support members and a plurality of second housings, wherein each of the plurality of second support members extends from the body to a respective one of the plurality of second housings, wherein the plurality of second support members are positioned in alternating arrangement with the plurality of first support members along the circumferential direction, wherein the plurality of second housings are positioned in alternating arrangement with the plurality of first housings along the circumferential direction.

7. The bearing system of claim 6, wherein each second support member comprises:
   a second axial support arm extended along the axial direction;
   a second radial support arm extended from the second axial support arm along the radial direction toward the rotor.

8. The bearing system of claim 7, wherein each of the plurality of second support members positions a respective one of the plurality of second housings in operable arrangement next to the rotor to form a fluid film bearing between the respective one of the plurality of second housings and the rotor.

9. The bearing system of claim 8, wherein each of the plurality of second support members positions a respective one of the plurality of second housings to form a second cavity between the respective one of the plurality of second housings and the rotor, and wherein a second passage is formed within each of the plurality of second support members in fluid communication with the second cavity of the respective one of the plurality of second housings.

10. The bearing system of claim 8, wherein a first one of the plurality of first housings and a first one of the plurality of second housings are aligned along the axial direction.

11. The bearing system of claim 7, wherein at least one of the plurality of first support members comprises a first material, and wherein at least one of the plurality of second support members comprises a second material different from the first material.

12. The bearing system of claim 11, wherein the first material and the second material comprise at least one of a shape memory alloy, a metal matrix composite material, a ceramic matrix composite material, a polymer matrix composite material, a metal, and a metal alloy.

13. The bearing system of claim 1, comprising:
    a plurality of second support members; and
    a second housing that extends along the circumferential direction to surround the rotor, wherein the second housing is connected to the plurality of second support members.

14. The bearing system of claim 1, wherein each bearing element is at least one of a spherical ball bearing, a cylindrical roller bearing, a tapered roller bearing, and a needle bearing.

15. The bearing system of claim 14, wherein at least one of the plurality of first housings includes at least two bearing elements.

16. A gas turbine engine, the gas turbine engine comprising:
    a fan assembly, wherein the fan assembly comprises a plurality of fan blades and a vane assembly;
    a core engine configured to drive the plurality of fan blades of the fan assembly; and
    a bearing system positioned at one or more of the core engine, the plurality of fan blades, and the vane assembly, wherein the bearing system is configured to surround a rotor of at least one of the core engine and the fan assembly along a circumferential direction corresponding to the rotor, wherein the rotor is extended along an axial direction co-directional to a centerline axis of the rotor, wherein the bearing system comprises:
    a body;
    a plurality of first support members; and
    a plurality of first housings, wherein is each of the plurality of first support members extends from the body to a respective one of the plurality of first housings, wherein the plurality of first support members are spaced apart from one another along the circumferential direction, wherein the plurality of first housings are spaced apart from one another along the circumferential direction;
    wherein each first support member comprises:
       a first axial support arm extended along the axial direction; and
       a first radial support arm extended from the first axial support arm along a radial direction; and
    wherein each of the plurality of first housings includes a bearing element in contact with a bearing surface at the rotor.

\* \* \* \* \*